United States Patent Office 2,885,262
Patented May 5, 1959

2,885,262

STABILIZED MANGANESE DIOXIDE

Joseph Fleischer, New Haven, Richard C. Evans, Hamden, and Franklyn E. Stevens, Jr., New Haven, Conn., assignors to Olin Mathieson Chemical Corporation, New Haven, Conn., a corporation of Virginia No Drawing. Application August 22, 1955
Serial No. 529,894

4 Claims. (Cl. 23—145)

This invention relates to the stabilization of manganese dioxide in high energy crystal forms, which are particularly adapted for use as improved depolarizers in dry cells.

It has been known that certain forms of manganese dioxide, for example, the synthetic "delta" and "epsilon" forms, when incorporated in the cathode of Leclanche and other dry cells, yield higher initial voltage and display higher capacity than other forms, provided such cells are tested soon after assembly. However, if such cells are stored, the capacity decreases rapidly during storage so that the cells become practically useless within six to twelve months.

It has been observed that such deterioration in capacity is accompanied by a physical alteration, corresponding to recrystallization, of the manganese dioxide component of the cathode. After being in contact with the electrolyte, amorphous particles of such manganese dioxide become transformed to crystals, often needle-shaped, or clumps of crystals and the X-ray diffraction pattern or electron diffraction pattern is changed from that corresponding to a high energy form (delta, epsilon, or gamma) to a lower energy form, such as alpha. However, the accompanying deterioration in capacity is largely ascribable to the disruption of electrically conducting paths of carbon black particles in the cathode mixture by the recrystallization of the manganese dioxide.

It was, therefore, postulated that inhibition of such recrystallization or, in other words, stabilization of the high energy forms of manganese dioxide in contact with electrolyte, would prevent or substantially reduce such deterioration. As will be seen, this result has been attained even to the extent that "delta" manganese dioxide, the most active and least stable form, has been successfully stabilized against transformation. So far as known, this is the first time an unstable crystal form of any substance has been thus stabilized.

The principal object of this invention is to provide manganese dioxide in a high energy form, stabilized against recrystallization to lower energy form when maintained in contact with an electrolyte solution. Another object is the provision of such stabilized or inhibited high energy manganese dioxide as a cathode component of dry cells displaying excellent maintenance of electrical characteristics on storage. Further objects will be apparent from the following description.

We have found that the foregoing objects are attained by the provision of high energy manganese dioxide the crystals or particles of which are stabilized against change to a lower energy form by treatment with a sufficient proportion of an effective recrystallization inhibitor. Water-soluble organic dyes have been found especially suitable for the purpose, particularly those containing one or more sulfonic groups. Some of the most effective dyes are sulfonated triphenylmethane dyes and, accordingly, dyes of this group are generally the most highly preferred.

The various known forms of manganese dioxide are characterized basically by means of X-ray diffraction patterns or electron diffraction patterns. Table 1 lists the characteristic lines for the different forms, although no indication is given as to the relative intensities of the individual lines which generally differ from each other.

TABLE 1

*Diffraction lines in Angstrom units of various forms of manganese dioxide*

| Delta | | Epsilon | | Alpha | | Gamma-A | | Gamma-B | | Rho | | Beta | |
|---|---|---|---|---|---|---|---|---|---|---|---|---|---|
| X | E | X | E | X | E | X | E | X | E | X | E | X | E |
|  |  | 7.3 |  |  |  |  |  |  |  |  |  |  |  |
|  |  | 5.0 |  | 7.0 | 7.0 |  |  |  |  |  |  |  |  |
|  |  |  |  | 5.0 | 5.0 |  |  |  |  |  | 4.7 |  |  |
|  |  |  |  |  |  |  |  |  |  | 4.2 |  | 4.2 |  |
|  |  |  |  |  |  | 3.7 |  | 3.7 |  |  |  |  |  |
|  |  | 3.63 |  |  |  |  |  |  |  |  |  | 3.1 | 3.1 |
|  |  |  |  | 3.1 | 3.1 |  |  |  |  | 2.44 |  |  |  |
| 2.4 | 2.4 | 2.4 | 2.4 | 2.4 |  | 2.4 | 2.4 | 2.4 | 2.4 | 2.4 | 2.4 | 2.4 | 2.4 |
|  |  | 2.31 |  |  | 2.38 |  |  |  |  |  |  |  |  |
|  |  |  |  |  |  |  |  |  |  |  |  | 2.2 |  |
| 2.1 | 2.1 | 2.1 | 2.1 | 2.1 | 2.1 | 2.1 | 2.1 | 2.1 | 2.1 | 2.1 2.0 1.85 | 2.1 2.0 | 2.1 1.95 | 2.1 1.95 |
|  |  |  |  | 1.83 |  |  |  |  |  |  |  |  |  |
|  |  |  |  |  | 1.80 |  |  |  |  |  |  |  |  |
|  |  | 1.70 |  |  |  |  |  |  |  |  |  |  |  |
|  |  |  |  | 1.63 | 1.63 | 1.63 | 1.63 | 1.63 | 1.63 | 1.63 1.60 | 1.63 | 1.63 | 1.63 |
|  |  |  |  | 1.54 1.46 | 1.54 |  |  |  |  | 1.46 |  | 1.54 | 1.54 |
| 1.41 | 1.41 | 1.41 | 1.41 | 1.41 | 1.41 1.38 | 1.41 | 1.41 | 1.41 | 1.38 | 1.41 | 1.41 | 1.41 1.36 | 1.41 |
|  |  |  |  | 1.35 | 1.35 |  |  |  |  |  |  |  |  |
|  |  | 1.30 |  | 1.29 1.23 | 1.29 |  |  |  |  | 1.30 | 1.30 | 1.29 | 1.29 |
|  |  |  | 1.20 |  |  |  |  |  |  |  |  |  |  |

X represents X-ray diffraction lines.
E represents election diffraction lines.

The "delta" and "epsilon" forms listed in Table 1 are characteristic of certain synthetic manganese dioxides. For example, the commercially available form of manganese dioxide known as "light hydrate," made by the chemical reduction of potassium permanganate, corresponds to the "delta" form. Likewise, the "epsilon" form may be synthesized by dissolving manganous sulfate in water, adding sufficient sodium hydroxide to precipitate manganous hydroxide and render the solution alkaline, and passing a stream of air or oxygen through the mixture to oxidize the precipitate to manganese dioxide.

Such forms of manganese dioxide are more active as dry cell cathodes than natural or synthetic manganese dioxide of the "alpha" (cryptomelane) or "beta" (pyrolusite) forms. That is, dry cells containing a cathode wherein the manganese dioxide component is of the "delta" or "epsilon" form display higher voltages or higher electrical capacity or both than cells similar in all respects except that the manganese dioxide in the cathode is of "alpha" or "beta" form.

However, the active forms of manganese dioxide as known heretofore yield dry cells in which the operating characteristics deteriorate very rapidly on storage.

If light hydrate is mixed with about twice its weight of a dry cell electrolyte solution, for example, one containing 24% by weight of ammonium chloride, 34% by weight of zinc chloride, and 42% water, and the mixture is maintained at a temperature of 90° C., the manganese dioxide undergoes recrystallization. After several days to a week under these conditions, the manganese dioxide which at the start displayed the "delta" diffraction pattern shows only the lines characteristic of "alpha."

Furthermore, if the "alpha" manganese dioxide thus formed is thoroughly washed with water, until the filtrate is substantially free from electrolyte, and dried, the resulting product is a fluffy material of much lower apparent density than the original light hydrate.

A like transformation of the light hydrate from "delta" to "alpha" occurs when it is incorporated in dry cells as cathode and stored for about six months at room temperature or for shorter lengths of time at higher temperatures.

For example, in one series of tests, dry cells made with light hydrate as the manganese dioxide component of the cathode displayed high initial capacity. However, the capacity decreased on storage at room temperature as shown in Table 2.

TABLE 2

Effect of storage at room temperature on electrical capacity of dry cells with light hydrate depolarizer.

Storage time: Average capacity
    Initial_____ 1034 minutes.
    3 months_____ 876.
    6 months_____ 695 (0 for some cells).
    12 months_____ 0.

In accordance iwth this invention, such crystal transformations of active forms of manganese dioxide are prevented or significantly inhibited by means of organic dyes which display appreciable solubility in water or aqueous salt solutions. Stabilization in this manner of the crystal structure of the manganese dioxide used as the cathode has been found to impart stabilization of the electrical characteristics of the resulting dry cells to a surprising and unprecedented extent.

The above described treatment of one part by weight of light hydrate, containing about 5 to 8% moisture, with about two parts by weight of dry cell electrolyte solution for a week at 90° C. was repeated, except that about 0.1 part by weight of water-soluble dye was first dispersed uniformly in the electrolyte solution. An extensive number of dyes were so tested and were found to exert a tremendous effect in that recrystallization of the manganese dioxide was inhibited completely or to a significant extent, as shown by X-ray or electron diffraction studies or by assembly of the thus-stabilized active manganese dioxide in dry cells and tests of the capacity of the cells after extended storage. Also, the dye-treated samples, after being washed with water and dried, consist of fine powders quite similar in appearance, apparent density and handling properties to the original light hydrate. This contrasts markedly with the product resulting from the same treatment but in the absence of dye, consisting of fluffy material of much lower apparent density than the original light hydrate.

As will be seen later, certain dyes substantially prevent any recrystallization of the delta manganese dioxide, others result in a product of high battery activity consisting essentially of the epsilon form of manganese dioxide, while other dyes result in mixtures in which part of the manganese dioxide is transformed to the alpha form. It has also proved possible to make a stabilized active manganese dioxide product consisting essentially of a mixture of the delta and epsilon forms or of a mixture of the epsilon and alpha forms.

Analyses by means of electron diffraction patterns are based on the following. Reference to Table 1 shows that the starting light hydrate material (delta) is characterized by three lines at 2.4, 2.1 and 1.41 Angstrom units. As this material is transformed to the epsilon form, a new line appears at 1.20 and the relative intensity of this line, with respect to the other three, increases with the extent of conversion. Alpha may be disinguished from delta and epsilon by the shift of the 2.4 line to 2.38 accompanied by a marked increase in line definition and from epsilon by the disappearance of the 1.20 line. The analysis may be also confirmed by the appearance of the particles under the electron microscope, as delta is usually characterized by amorphous three-dimensional particles, epsilon as exceedingly thin flakes or sheets and alpha by elongated crystalline particles, which in some cases are growing out of particles of either or both delta and epsilon.

While, as stated above, a wide variety of dyes of differing composition and functional groups has been found effective for the purpose, the preferred dyes are those which result in an active manganese dioxide in which the starting crystalline form is largely preserved or where the conversion, if any, is largely to the next lower form. Thus, if the starting material is delta, the preferred dyes are those which result in a product which contains a substantial proportion of delta or epsilon or both. Many of the dyes which are effective in this manner are included in sulfonated dyes belonging to the ketonimine, diphenylmethane and triphenylmethane classes of dyes. Such preferred dyes have color index numbers between 655 and 738 inclusive, as listed in the "Colour Index," published by the Society of Dyers and Colourists, Bradford, Yorkshire, England (first edition 1924 and first supplement 1928). It will be understood, however, that water-soluble dyes of other classes and compositions, identified by color index numbers outside the above lists, also display crystal stabilizing properties with respect to active forms of manganese dioxide in accordance with this invention, it being essential only to exclude dyes such as Acid Violet (color index 698) and Thioflavine (color index 815) which are sufficiently reactive towards manganese dioxide to reduce a substantial portion thereof.

The following dyes were applied in accordance with the above-described procedure and resulted in manganese dioxide in which the diffraction pattern was preserved as that corresponding to the delta form and which other tests and observations indicated to be purely or largely delta.

DELTA (MAJOR)

| Trade Name | Color Index No. | Manufacturer or Supplier |
|---|---|---|
| Amacid Fast Green ex bluish | 691 | American Aniline Products, Inc. |
| Bismarck Brown | | Central Scientific Co. |
| Aniline Blue | | Do. |
| Victoria Pure Blue RB ex. conc. | 728 | Ciba Co., Inc. |
| Auramine O Base | 655 | Do. |
| Fuchsine N Powder | 677 | Do. |
| Auramine OO ex. conc. | 655 | Do. |
| Soluble Blue S3R conc. | 707 | Du Pont. |
| Erioglaucine Supra Conc. | 672 | Geigy Co., Inc. |
| Magenta G conc. cryst. | 677 | Do. |
| Erio Chrome Azurol B-CRS | 720 | Do. |
| Fast Acid Violet 10 BG High conc. | 696 | General Dyestuff Corp. |
| Wool Green BSNA conc. | 737 | Do. |
| Soluble Blue B ex conc. | 707 | Do. |
| Ink Blue BJTBNA-80 ex. | 706 | Do. |
| Tungstate Blue Toner BT 311 | 728 | Holland Color & Chem. Co. |
| Tungstate Purple Toner PT408 | 680 | Do. |
| Alkali Blue BT | 704 | New York Color & Chem. Co. |

The following dyes under the same procedure yielded manganese dioxide which was substantially pure epsilon or largely epsilon.

EPSILON (MAJOR)

| Trade Name | Color Index No. | Manufacturer or Supplier |
|---|---|---|
| Alphazurine Blue | | Central Scientific Co. |
| Chrysophenine Yellow [1] | | Do. |
| Biebricht Red | | Do. |
| Fast Violet | | Do. |
| Chrysophenine Conc. [1] | 365 | Ciba Co., Inc. |
| Acid Violet 6 BN | 717 | Do. |

[1] Product almost pure epsilon.

"Setoglaucine Supra," color index 658, made by Geigy Company, Inc. produced a mixture largely of delta and epsilon, while "Magara Blue," furnished by Central Scientific Company produced a mixture largely of epsilon and alpha.

The following dyes resulted in a mixture largely consisting of delta and alpha.

DELTA-ALPHA MIXTURE

| Trade Name | Color Index No. | Manufacturer or Supplier |
|---|---|---|
| Amacid Blue A | 714 | American Aniline Products, Inc. |
| Ink Blue R #2057 Powder | 707 | Calco Chem. Div. American Cyanamid Co. |
| Red Fuchsine (acid) | | Central Scientific Co. |
| Kiton Pure Blue L | 671 | Ciba Co., Inc. |
| Paper Acid Blue RC | 707 | Do. |
| Indigotine | 1180 | Do. |
| Pigment Scarlet 3B | 216 | Do. |
| Chrysodine Y ex. conc. | 20 | Do. |
| Nigrosine WS Jet Pdr. | 865 | Do. |
| Congo Red | 370 | Do. |
| Paper Acid Blue BC | 707 | Do. |
| Alizarine Red S Pdr. | 1034 | Do. |
| Methyl Violet 4 BX | 680 | Do. |
| Eosine Y | 768 | Do. |
| Bismarck Brown R extra conc. | 332 | Do. |
| Alizarine Fast Violet R | 1073 | Do. |
| Crystal Violet 6B ex pure | 681 | Do. |
| Patent Phosphine GO ex conc. | 789 | Do. |
| Methylene Blue 2B conc. | 922 | Do. |
| Erythrosine B | 773 | Do. |
| Kiton Pure Blue V | 712 | Do. |
| Rhodamine B ex. | 749 | Do. |
| Ethyl Violet C conc. pdr. | 682 | Do. |
| Eric Green B conc. | 735 | Geigy Co., Inc. |
| Neptune Blue BRA conc. | 671 | General Dyestuff Corp. |
| Guinea Green BA extra conc. | 666 | Do. |
| Victoria Green Base | 657 | Do. |
| Sulpho Rhodamine B extra | 748 | Do. |
| Light Green SFA conc. | | Do. |
| Aniline Blue | | National Aniline. |
| Sol. Blue 2B ex. | 707 | Do. |

The following dyes resulted in mixtures in which the alpha material was present in substantial amounts together with delta and epsilon.

ALPHA-DELTA-EPSILON MIXTURE

| Trade Name | Color Index No. | Manufacturer or Supplier |
|---|---|---|
| FD & C Yellow #4 (Yellow OB) | 61 | Calco Chem. Div. American Cyanamid Co. |
| Congo Red | | Central Scientific Co. |
| Alizarine Red | | Do. |
| Nigrosine Black | | Do. |
| Fuchsine CS X conc. | 677 | Ciba Co., Inc. |
| Brilliant Green Cryst. | 662 | Do. |
| Fast Acid Violet ARR | 758 | Do. |
| Acid Green | 666 | Do. |
| Kiton Fast Violet 10 B | 696 | Do. |
| Chrysodine R | 21 | Do. |
| PB—6-D Soluble Blue | 707 | Du Pont. |
| Benzyl Violet DSC Pdr. | 683 | Dye Specialties Corp., Inc. |
| Malachite Green Cryst. Conc. | 657 | Geigy Co., Inc. |
| Sudan Yellow 2 GA | 19 | General Dyestuff Corp. |
| Sudan Yellow GRN | PR 472 | Do. |
| Rose Bengal DY extra | 779 | Do. |
| Rhoduline Blue 6 GA conc. | 658 | Do. |
| Acid Violet 4 BLD | 699 | Do. |
| Sudan Yellow RA | 15 | Do. |
| Neptune Green SGXA | 667 | Do. |
| Magenta ABN conc. powder | 678 | Do. |
| Sudan Yellow RA | 17 | Do. |
| Tungstate Rose Toner RT 384 | 752 | Holland Color & Chem. Co. |
| National Wool Violet 4 BN | 697 | National Aniline. |
| Alkali Blue 2 RX (Red Shade) | 704 | New York Color & Chem. Co. |
| Spirit Blue B | 689 | Do. |
| Alkali Blue 6B (green shade) | 704 | Do. |
| Direct Black GX 200% | 581 | Young's Aniline Works. |
| Alizarine Violet ZBS | 781 | Zinsser & Co., Inc. |

It will be observed from the above tables that certain dyes may vary in effectiveness depending upon the grade or the source. Examples are "Fuchsine" (color index 677), "Soluble Blue" or "Acid Blue" (color index 707), "Fast Violet" (color index 696) and "Alakli Blue" (color index 704). This appears to be due to the fact that many of the commercially available dyes actually consist of a number of components as has been established chromatographically. For example, "Aniline Blue" has been subjected to chromatographic analysis and found to contain twelve components and "Ink Blue" 16. In such cases, different grades of a given dye may have the components present in different ratios and not all the components may be effective for crystal stabilization. However, certain dyes have been shown chromatographically to contain a single component, for example "Wool Green" (color index 737), "Amacid Fast Green" (color index 691) and "Erio Chrome Azurol" (color index 720).

It is also to be understood that mixtures of commercially available dyes are effective in crystal stabilization of manganese dioxide. Such use of mixtures of dyes may at times be advantageous in accomplishing more effective stabilization with the use of a given proportion of dye to manganese dioxide.

In the following Table 3, tests of electrical capacity of dry cells, assembled with the use of light hydrate (delta manganese dioxide) after treatment with the listed dyes in the above-described manner as cathode, are listed and substantiate the tremendous stabilization accomplished by this invention.

TABLE 3

Effect of storage at room temperature on average electrical capacity of dry cells with dye-stabilized light hydrate depolarizer.

| Dye | Initial, percent | 3 mos., percent | 6 mos., percent | 12 mos., percent |
|---|---|---|---|---|
| None | 100 | 85 | [1] 67 | 0 |
| Aniline Blue | 100 | 98 | 103 | 100 |
| Alphazurine Blue | 100 | 97 | 97 | 95 |
| Bismarck Brown | 100 | 97 | 99 | 101 |

[1] (0 for some cells.)

The retention of capacity after storage indicated by the tests recorded in the above table for the cells containing dye-stabilized manganese dioxide is phenomenal and believed to be unprecedented for Leclanche or other primary cells. A further advantage is the smaller spread of capacity values of individual cells in a lot, both initially and after storage which has been substantiated experimentally as shown, for example, by the values in Tables 4 and 5, for "C" size cells.

TABLE 4

High, low and average minutes of initial capacity.

| Dye | High | Low | Average |
|---|---|---|---|
| None | 1,096 | 891 | 1,034 |
| Aniline Blue | 820 | 770 | 789 |
| Alphazurine Blue | 633 | 622 | 627 |
| Bismarck Brown | 543 | 510 | 329 |

TABLE 5

High, low and average minutes of capacity after three months' storage at room temperature.

| Dye | High | Low | Average |
|---|---|---|---|
| None | 960 | 777 | 876 |
| Aniline Blue | 800 | 733 | 770 |
| Alphazurine Blue | 618 | 600 | 610 |
| Bismarck Brown | 545 | 494 | 515 |

The foregoing storage test results were obtained under conditions similar to those of the standard BA-30 test, obtained in testing "C" size dry cells with the use of an external resistance of 16 ohms and in "D" size cells with the use of an external resistance of 6.67 ohms. The cells under test are discharged through the external resistance for four minutes each half hour for ten hours a day, five days per week. The capacity and minutes is given by the discharge time to an end voltage of 0.93 volt.

Generally, the treatment of manganese dioxide with ten percent of its weight of a dye brings about some decrease in the initial capacity value, due at least in part to the presence at the particle surfaces of non-conductive or electrochemically inert substance. We have found that such effects can be decreased if desired by reducing the proportion of dye to five percent or less by weight of the manganese dioxide. However, in general, the proportion should be maintained at more than one or two percent in the case of the dyes which have been tested in order to obtain a signficant extent of stabilization. We have further found that the proportion of dye to manganese dioxide is a controlling factor and that essentially similar extents of stabilization are obtained with a given proportion of dye applied at varied dilutions.

Preferably, the application of the dye or dye mixture is effected in the presence of water containing dissolved electrolyte at a temperature between 50° C. and the boiling point of the solution and for a period of at least five to ten hours. While the electrolyte may consist of one or more soluble ammonium or metal, particularly the alkali metal and the metals of group II of the periodic table, salts, the halides, for example the chlorides and bromides, are preferred and should be present at a concentration of at least about 5% by weight of the solution. Aqueous solutions containing 5% or more by weight of zinc chloride or bromide have been indicated as particularly effective in accelerating or enhancing the stabilizing action by the dye or dyes.

It is to be understood that other methods of accomplishing the crystal stabilization of active forms of manganese dioxide are likewise comprehended by the invention. A particularly advantageous embodiment includes provision for stabilization of the active manganese dioxide crystal form during the deposition, precipitation or formation of the particles by arranging for the dispersion of the effective dye or dyes in the reaction medium. This includes syntheses wherein manganese dioxide is precipitated from a solution of a dissolved manganese-containing salt either by the oxidation of manganese from a lower valence, as of a manganous salt, or by the reduction of manganese from a higher valence, as of a soluble permanganate such as of potassium.

In the deposition of electrolytic manganese dioxide, the objective has generally been to produce a predominantly gamma form of manganese dioxide. However, two varieties of this form, gamma A and gamma B, have been recognized, one of which or mixtures of which are produced by variables in the known manufacturing processes which have previously defied attempts at control. It has been particularly difficult to manufacture pure gamma B consistently; this form appears to be highly desirable in dry cells because of resistance to the transformation to the alpha form in the presence of dry cell electrolyte, being much more resistant in this respect than the gamma A form. By including an effective proportion of dye, in accordance with this invention, in the solution being electrolyzed, the manganese dioxide product is gamma B or stabilized gamma A or a mixture thereof which yield dry cells of high capacity, which display improved retention of capacity on storage.

It is furthermore important that the active manganese dioxide be stabilized in accordance with this invention, either at the time of synthesis or by pretreatment, before being assembled as a dry cell cathode. Otherwise, the effectiveness of the dye is substantially minimized, probably because of adsorption of the dye on the graphite, acetylene black, or other carbon black present in the cathode mixture.

We claim:

1. The process of stabilizing high energy manganese dioxide against recrystallization which comprises treating such manganese dioxide with a recrystallization inhibitor consisting of a sulfonated triphenylmethane dye.

2. The process of stabilizing high energy manganese dioxide against recrystallization which comprises treating such manganese dioxide with a recrystallization inhibitor consisting of a sulfonate dye selected from the group consisting of ketonimine, diphenylmethane, and triphenylmethane dyes.

3. A stabilized, high energy manganese dioxide consisting of a material comprising at least one of delta, epsilon and gamma crystal which have been treated with a sulfonated dye selected from the group consisting of ketonimine, diphenylmethane and triphenylmethane dyes.

4. A stabilized, high energy manganese dioxide consisting of a material comprising at least one of delta, epsilon and gamma crystals which have been treated with a sulfonated triphenylmethane dye.

References Cited in the file of this patent

UNITED STATES PATENTS

| 2,616,785 | Butchart | Nov. 4, 1952 |
| 2,616,786 | Whetstone | Nov. 4, 1952 |
| 2,716,078 | Welsh | Aug. 23, 1955 |